Aug. 28, 1962 M. STAUNT 3,050,856
DENTAL HANDPIECES
Filed Aug. 13, 1959 7 Sheets-Sheet 1
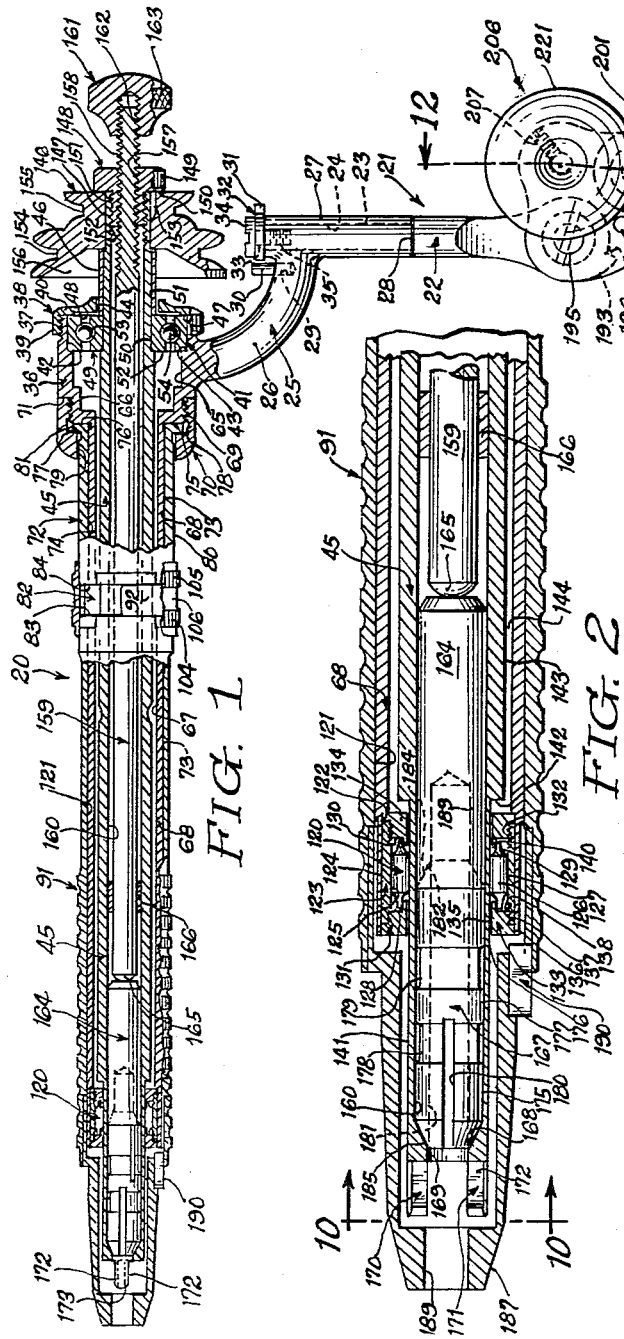
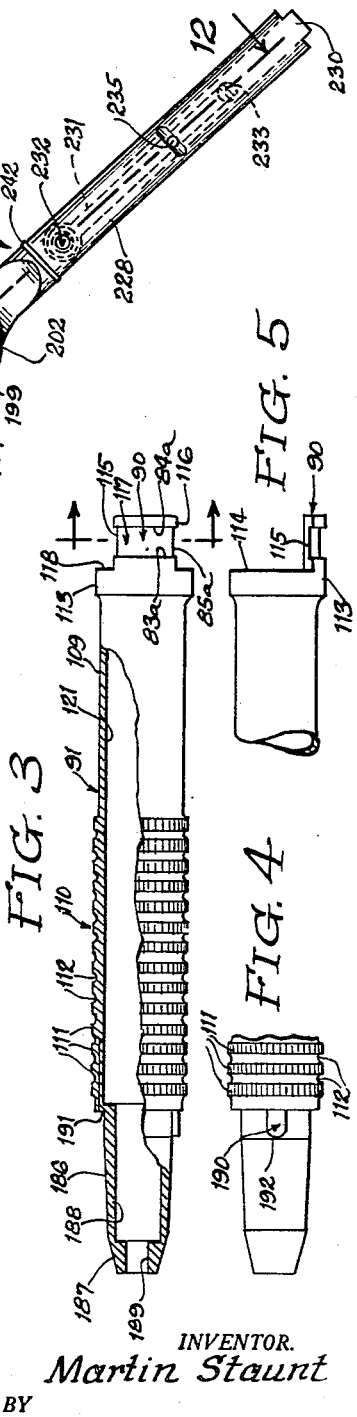
INVENTOR.
Martin Staunt
BY
his Attorney

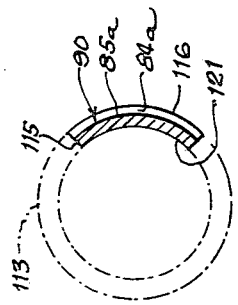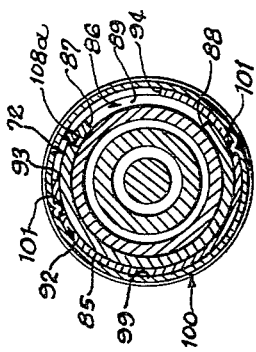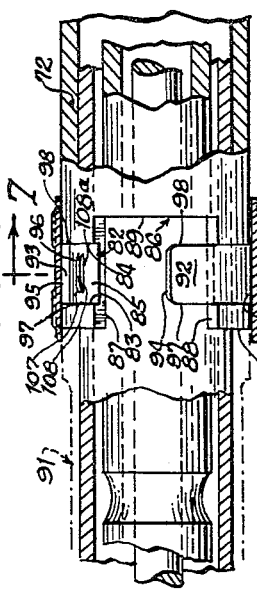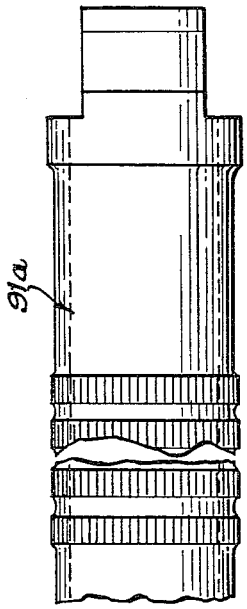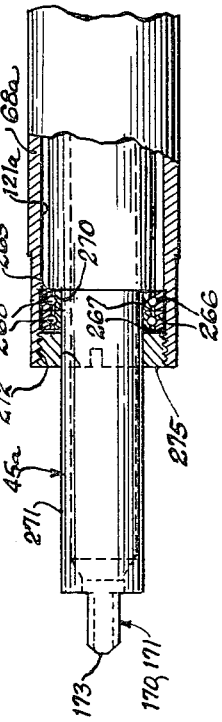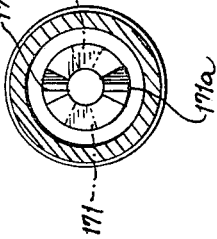
INVENTOR.
Martin Staunt
BY
his Attorney

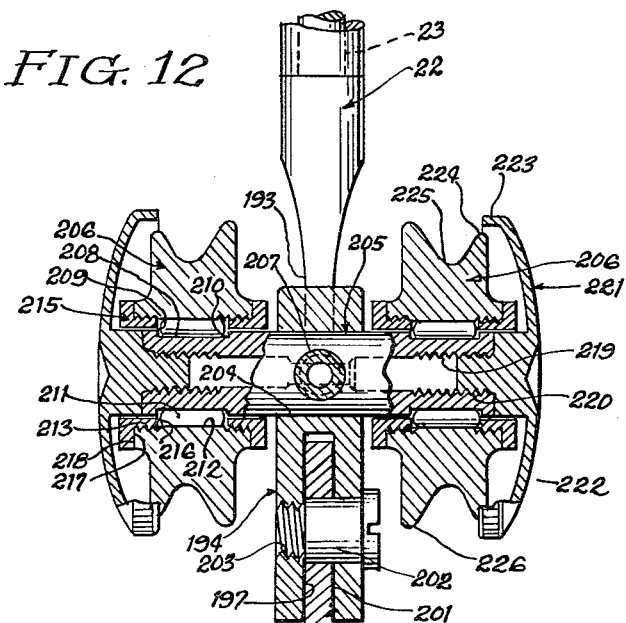
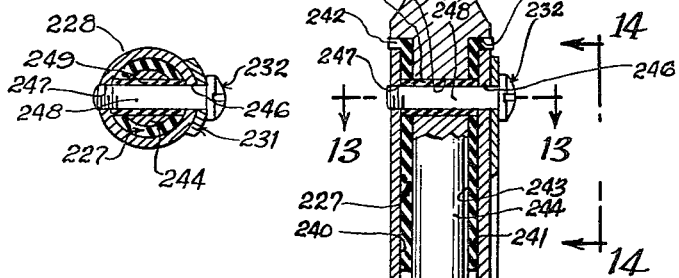
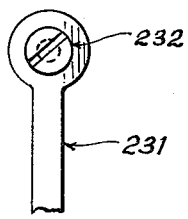
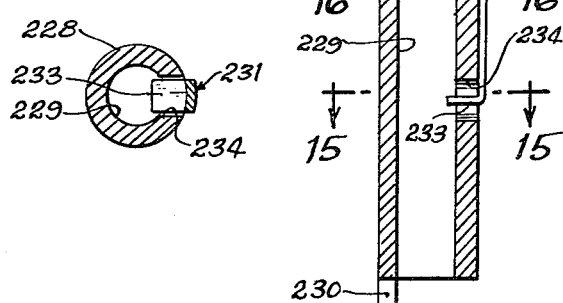

Aug. 28, 1962 M. STAUNT 3,050,856
DENTAL HANDPIECES
Filed Aug. 13, 1959 7 Sheets-Sheet 4

--- No Coolant 1.5 Lbs. Press.
——— Water Cooled 1.5 Lbs. Press.

INVENTOR.
Martin Staunt
BY his Attorney

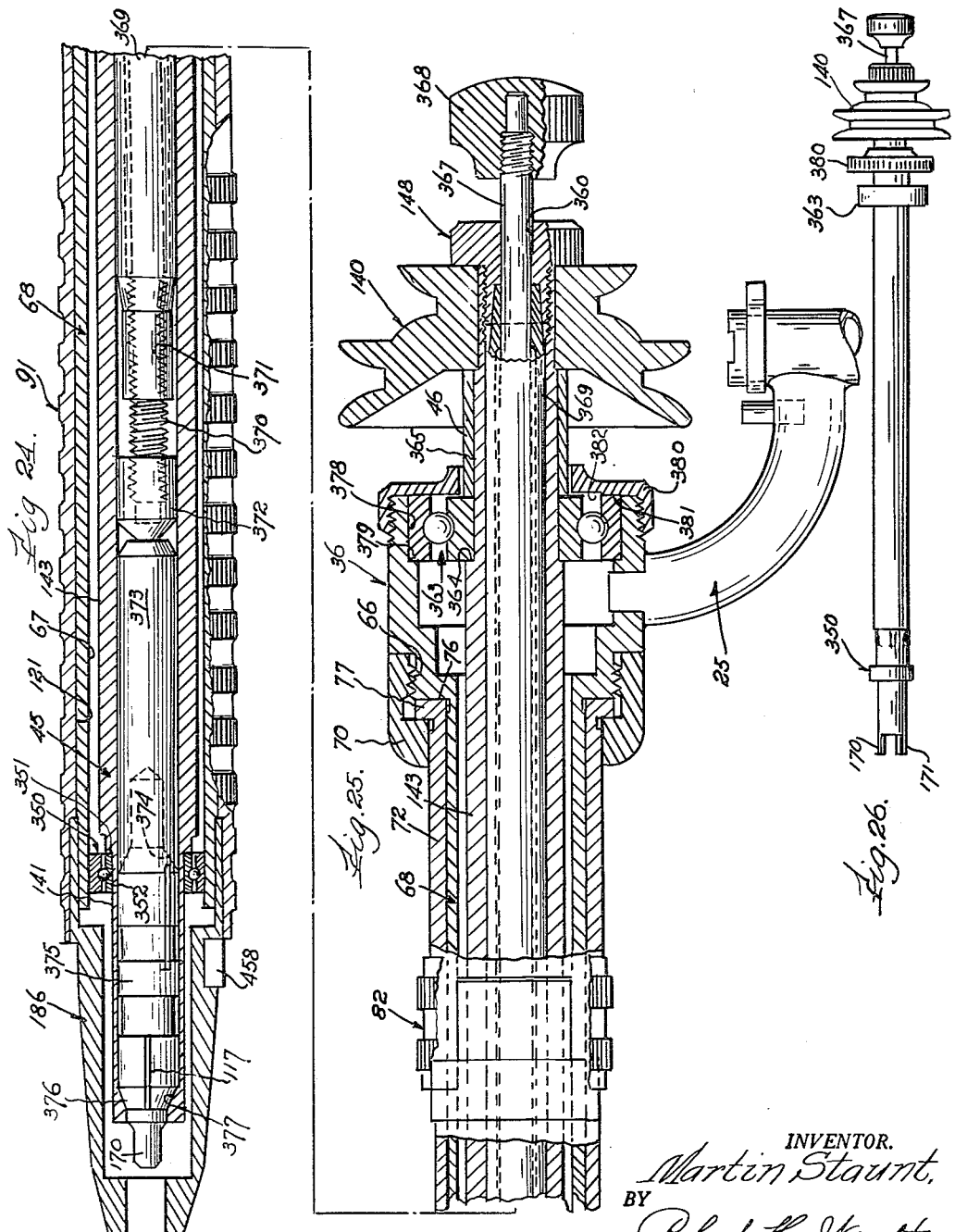

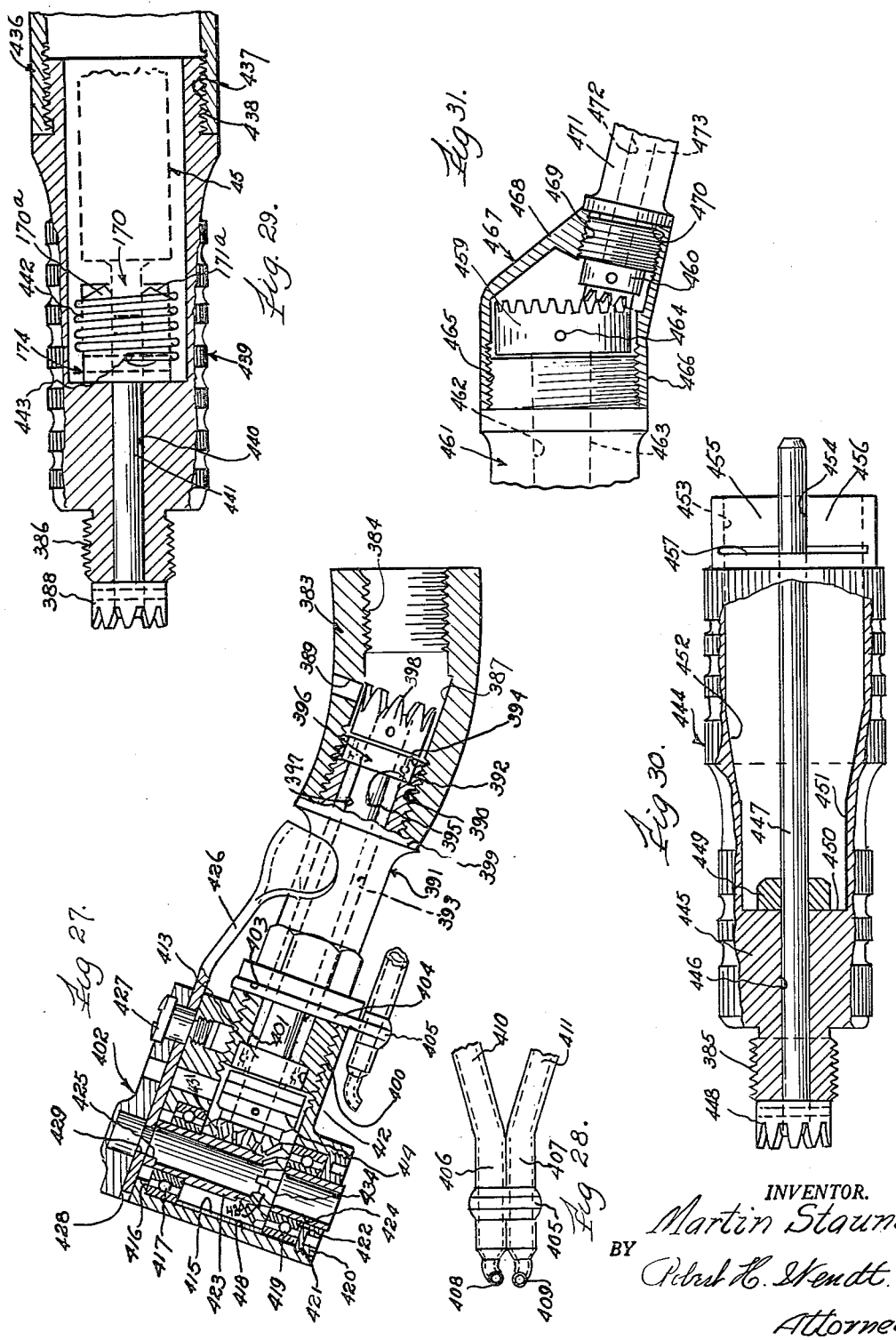

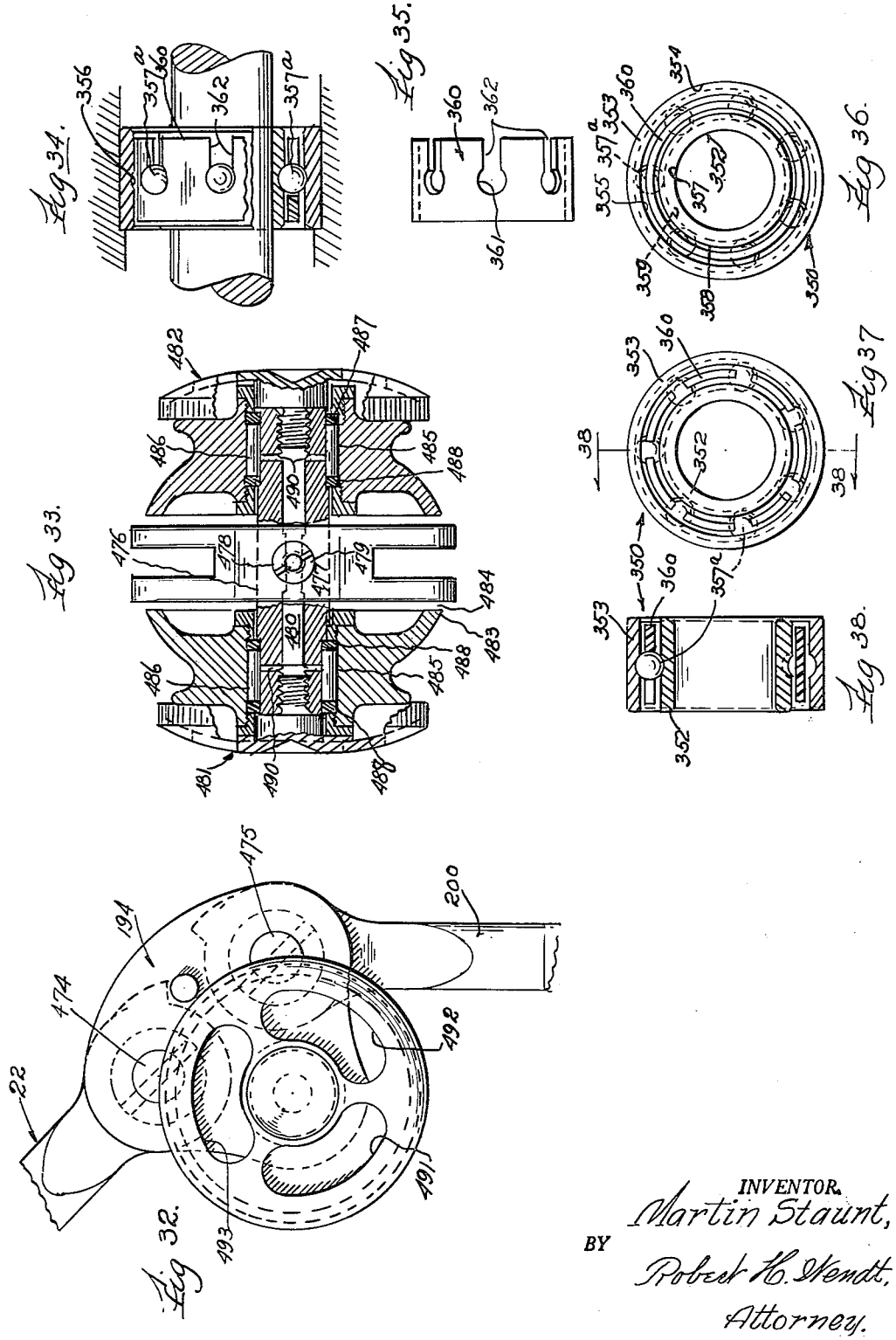

United States Patent Office 3,050,856
Patented Aug. 28, 1962

3,050,856
DENTAL HANDPIECES
Martin Staunt, Des Plaines, Ill.
(4439 W. Rice St., Chicago, Ill.)
Filed Aug. 13, 1959, Ser. No. 833,412
28 Claims. (Cl. 32—26)

The present invention relates to dental handpieces, and is particularly concerned with the provision of improved dental handpieces adapted to be operated at higher rotative speeds.

The present application is a continuation-in-part of my prior application on Dental Hand Pieces, Ser. No. 494,607, filed March 16, 1955, and allowed March 9, 1959, and now abandoned.

One of the objects of the invention is the provision of improved dental handpieces adapted to be operated at rotative speeds in excess of 25,000 r.p.m. and which will run cooler and more smoothly, and also more quietly than the devices of the prior art.

Another object of the invention is the provision of improved dental handpieces with higher operating speeds which will enable the dentists to accomplish their work with greater ease and speed, reducing the cavity preparation time to a fraction of that formerly required by the devices of the prior art.

Another object of the invention is the provision of improved dental handpieces which may be operated at lighter pressures and which produces less vibration and reduces frictional heat, all of which contribute to the result of causing less trauma to the patient.

Another object of the invention is the provision of improved handpieces having improved bearings which are adapted to take the lateral and axial thrust that is placed upon them by use of the handpiece, and which operates more smoothly and with less vibration and noise, and at greater speeds than the devices of the prior art.

Another object of the invention is the provision of an improved handpiece assembly which is adapted to be used with the burs and contra angles and other attachments of the prior art, but which is also adapted to be used with a plurality of high speed attachments, any one of which is quickly substituted for another in the assembly, thereby enabling the user to have available a plurality of different handpiece assemblies by merely purchasing one handpiece and the additional attachments.

Another object of the invention is the provision of an improved dental handpiece and attachments of the anti-friction type adapted to be operated at much higher speeds than the devices of the proior art due to the use of special anti-friction bearings mounted in the most simple manner, which involves the use of a minimum number of parts and a minimum number of machine operations.

Another object of the invention is the provision of an improved dental handpiece of the ball bearing type, in which the entire spindle is removable with its ball bearings by merely unscrewing a cap at the pulley end, which holds the spindle and its adjacent ball bearing in the handpiece, so that the entire spindle and the sheath assembly may be cleaned and sterilized separately.

Another object of the invention is the provision of improved sleeve attachments for handpieces of the class described and the provision of improved lubricating arrangements for wrist joint pulleys and the provision of an improved high speed driving and elbow joint attachment for such handpieces.

Other objects and advantages of the invention will be apparent from the following description and the accompanying drawings, in which similar characters of reference indicate similar parts throughout the several views.

Referring to the drawings, of which there are seven sheets accompanying the specification, FIG. 1 is a side elevational view of a handpiece embodying the invention in partial section along a plane located in the axis of the spindle, showing the details of construction;

FIG. 2 is a larger fragmentary view taken on the same plane and showing the tool end of the handpiece in greater detail;

FIG. 3 is a side elevational view in partial section of the sheath of the handpiece of FIGS. 1 and 2;

FIG. 4 is a fragmentary side elevational view of the tool end of the sheath of FIG. 3;

FIG. 5 is a fragmentary side elevational view of the other end of the sheath, showing its mode of attachment to the handpiece;

FIG. 6 is a fragmentary sectional view taken on a plane passing through the axis of the spindle, showing on a larger scale the details of the attachment of the sheath to the handpiece;

FIG. 7 is a sectional view taken on the plane of the line 7—7 of FIG. 6, looking in the direction of the arrows;

FIG. 8 is a sectional view taken on the plane of the line 8—8 of FIG. 3, looking in the direction of the arrows;

FIG. 9 is a fragmentary elevational view in partial section on the plane of the axis of the shaft, showing the conversion sheath which may be employed on the handpiece of FIG. 1 for converting the various attachments to long sheath models;

FIG. 10 is a sectional view taken on the plane of the line 10—10 of FIG. 9, looking in the direction of the arrows;

FIG. 11 is a fragmentary side elevational view of the driving end of the conversion sheath, showing an alternative form of ball bearings;

FIG. 12 is a fragmentary sectional view taken through the wrist joint and pulleys, by means of which the handpiece and its driving belt are supported.

FIG. 13 is a sectional view taken on the plane of the line 13—13 of FIG. 12, looking in the direction of the arrows;

FIG. 14 is a fragmentary elevational view taken on the plane of the line 14—14 of FIG. 12, looking in the direction of the arrows;

FIG. 15 is a sectional view taken on the plane of the line 15—15 of FIG. 12, looking in the direction of the arrows;

FIG. 16 is a sectional view taken on the plane of the line 16—16 of FIG. 12, looking in the direction of the arrows;

FIG. 24 is a view similar to FIG. 1, showing a modification in which the spindle is provided with ball bearings of an improved type which are removable with the spindle;

FIG. 25 is a continuation of the right end of FIG. 24 on the same scale, showing this improved construction;

FIG. 26 is a side elevational view of the removable spindle unit with its ball bearing and threaded collar;

FIG. 27 is a sectional view taken on the plane defined by the axes of the two shafts, showing an improved ball bearing contra angle which may be employed as an attachment;

FIG. 28 is a fragmentary sectional view, showing the air and water nozzles as viewed from the bottom of FIG. 27;

FIG. 29 is an axial sectional view taken through the long attachment sleeve which may be used with the handpiece of FIGS. 24 and 25;

FIG. 30 is an axial sectional view, showing the short attachment sleeve having a shaft that is adapted to be held by the chuck of FIG. 24;

FIG. 31 is a fragmentary sectional view of a high speed drive gear arrangement embodied in an elbow joint and adapted to be employed with the attachments of the present handpiece;

FIG. 32 is a fragmentary elevational view of the wrist joint, similar to FIG. 1, but including various improvements;

FIG. 33 is a fragmentary sectional view, similar to FIG. 12, but including the additional improvements of FIG. 32;

FIG. 34 is a fragmentary sectional view, taken on the axis of a shaft, showing the ball bearing assembly which is preferably employed in all of the antifriction bearing assemblies used in the present handpieces;

FIG. 35 is a side elevational view of the ball retainer;

FIG. 36 is an end elevational view of one of the ball bearing assemblies, taken from the left end of FIG. 34;

FIG. 37 is a similar end elevational view of the ball bearing assembly, taken from the right end of FIG. 34;

FIG. 38 is a sectional view taken on the plane of the line 38—38 of FIG. 37, looking in the direction of the arrows.

Figure 17:
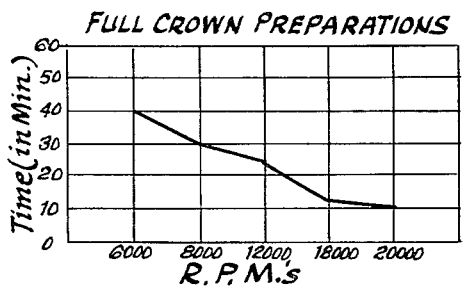
FIG. 17 is a reproduction of a graph showing reduction in time used for full crown preparation at higher speeds.

The wrist joint assembly 21 preferably includes the hinge member 22, having an axially projecting shaft 23, which is rotatably mounted in a bore 24 in the elbow member 25.

The elbow member 25 has a curved body portion 26 integrally joined to the sleeve bearing 27, which has the bore 24 fitting on shaft 23, against annular shoulder 28.

The elbow member 25 has a cylindrical bore 29 for frictionally receiving and holding a stop pin 30, which is adapted to be engaged by a radial shoulder 31, carried by a rotatable top stop member 32, which is mounted on the squared end 33 of shaft 23, by means of a squared aperture, so that it rotates with the shaft 23.

Stop member 32 also acts as an end thrust bearing and is secured by means of a screw bolt 34, threaded into a threaded bore 35.

Pin 30 and shoulder 31 prevent the wrist joint from making more than one revolution on the shaft 23 and prevent the belt from becoming twisted.

At its other end the elbow body 26 is formed with the integral bearing housing 36, which comprises a cylindrical body extending at substantially right angles to the shaft 23 and having an outer threaded portion 37 at its rear end.

This threaded portion is adapted to receive the internally threaded collar 38, which has a cylindrical flange 39 internally threaded, and an end flange 40 adapted to engage the outer ball bearing race 41 and secure it in a counterbore 42 against an annular shoulder 43.

The end flange 40 of the collar has a central bore 44 which has a clearance with respect to the spindle 45 and its spacing sleeve 46 so that there is no contact between the rotating spindle and the collar 38.

Collar 38 has an annular shoulder at 47 for engaging the side of the race 41 and the end flange 40 has a clearance at 48 beside the races of the ball bearing to avoid contact between the collar 38 and the inner race 49.

The races of the ball bearing assembly, indicated at 41 and 49, comprise hardened steel members; and the inner race 49 comprises an annular member having an inner bore 50 fitting on a reduced portion 51 of the spindle 45 against annular shoulder 52.

The inner race has plane end surfaces and an annular groove 53 of partially circular cross section in its outer cylindrical surface.

The outer race has an outer cylindrical surface fitting in the bore 42 against an annular shoulder 43, and has plane end surfaces and an annular groove of partially circular cross section on its inner cylindrical surface for receiving the balls 54, sufficient of which are provided in the grooves to extend all the way around the periphery of the grooves with a spacing between the balls.

The balls 54 (FIG. 21) may be mounted in a cage and the outer race 41 may be grooved to receive the oil seals 41a, which are held in place by split rings. The seals have a clearance with respect to inner race 49.

The cylindrical housing 36 has the enlarged bore 65 and a small counterbore 66 and a longer bore 67 in an integral tubular part 68.

The housing 36 has the reduced threaded portion 69 on its left end for receiving the internallly threaded collar 70 which abuts against an annular shoulder 71 and is used to secure the sleeve 72 of the handpiece to the wrist joint housing 36.

Tubular part 68 has a cylindrical outer surface 73; and the sleeve 72 has a cylindrical bore 74 so that the sleeve may slide on the tube 68 against an annular shoulder 75.

The sleeve 72 has a plane end 76 engaging the annular shoulder 75; and the sleeve has a radially projecting annular flange 77, which extends into the bore of collar 70 at the clearance 78, where the collar is unthreaded.

The collar 70 has a smaller counterbore 79 in its left end which is formed with an outer rounded surface; and the bore 79 is adapted to receive the sleeve 72, which has an outer cylindrical surface 80.

Collar 70 has the inner shoulder 81 which draws the radial flange 77 against shoulder 75. There is sufficient clearance between the flange 77 and the adjacent surfaces to permit the sleeve 72 to rotate inside the collar on the tube 68.

Referring to FIGS. 1 and 6, the sleeve 72 is provided with an annular groove 82, which is bounded by two annular shoulders 83, 84, and by a cylindrical surface 85 at the bottom of the groove.

This annular groove extends all the way around the sleeve 72, except that sleeve 72 has an axially extending slot 86 extending into its end beyond the groove 82, and defined by longitudinally extending edges 87, 88 which extend to the end 89 of the groove 86, as shown in FIGS. 6 and 7.

This groove 86 provides a longitudinally extending slot into which a longitudinally extending lug 90, carried by the sheath 91 (FIG. 3), may be moved in attaching the sheath.

The circumferential groove 82 about the end of sleeve 72 (FIG. 6) contains a resilient, partially cylindrical spring band 92, which has sufficient resiliency so that it can be sprung out of the groove 82 or sprung into the groove 82, as the band is open at its ends 93, 94 (FIG. 7); and the band is of sufficient thickness so that it may be wholly housed or received in the groove 82, where it may rotate slidably; and it is used for securing the sheath 91 to the sleeve 72.

Thus the band 92 has the outer and inner cylindrical surfaces 95, 96 (FIG. 6); and its width is sufficient to fit in the groove 82, having plane edge surfaces 97, 98 (FIG. 6).

Band 92 is of sufficient external diameter so that it is flush with the outside of sleeve 72, or the band may project slightly beyond sleeve 72 when it is secured in the cylindrical bore 99 of a rotatable actuating member 100, which may be assembled by sliding member 100 on the sleeve 72 and band 92 until it overlaps the sleeve 72 and the sheath 91.

The actuating member 100 is fixedly secured to the band 92 so that it may be used to rotate band 92 in groove 86. Band 92 may have a pair of oppositely located through bores 101, into which the adjacent parts of the member 100 may be forced with a center punch and brazed by a drop of brazing material.

Thus the band 92 is adapted to be rotated by the actuating member 100, which is actually a tube having the external knurled surfaces 104, 105, separated by a relief 106 and tapering toward both edges.

The band 92 is shorter circumferentially at the groove 82, in which it is mounted, than the adjacent portion of the sleeve 72, as will be seen in FIG. 7. Thus the ends of the band are at 93, 94, which are wider apart than the edges of the slot 87, 88, and the edges of the groove 82, indicated by 83 and 84, are inwardly deformed at 107 and 108 in FIG. 6, at a point which is spaced from the edge 87 of the slot 86.

This prevents band 92 from making a complete rotation; but it may rotate across the slot 86, that is, counter-clockwise in FIG. 7, until the end 94 of the band 92 completely traverses the slot 86 and strikes the stop 108. This is the locked position of the band 92.

Band 92 may also rotate in the opposite direction until its end 93 engages the stop 108, in which position the ends of the band 92 at 93 and 94 will be located outwardly of the ends of the slot 86, which are indicated at 87 and 88. In other words, the band will be completely out of the slot 86 in its unlocked position.

Referring to FIG. 3, the sheath 91 comprises a tubular metal member having outer cylindrical surfaces at 109 and a grooved gripping surface 110, having a plurality of cylindrical knurled lands 111 separated by partially circular grooves 112.

The grooves being circular makes them easy to keep clean, as foreign particles do not stick in circular grooves, as they do in rectangular corners.

At its right end, FIG. 3, the sheath 91 has an enlarged outer cylindrical surface 113 and a plane end surface 114, from which there projects a partially cylindrical lug or locking extension 90, which is an integral part of the sheath 91.

Lug 90 is bounded at its edges by radially located plane surfaces 115 and 116, which surfaces will be received between the edges 87 and 88 of the endwise slot 86 in the sleeve 72. In other words, the projecting extension on the end of the sheath 91 is complementary to the slot 86 that is formed for it in the sleeve 72.

The external cylindrical surface 113 of lug 90 is the same size as the external surface 80 on sleeve 72, and lug 90 has an internal bore which is the same size as the bore 67 in sleeve 72.

Lug 90 also has a peripherally extending shallow groove 117, which is of the same size and width as the groove 82 in the sleeve 72 in which the band 92 slides. The boundaries of groove 117 may be indicated by its edges 83a and 84a, and its bottom 85a, to indicate that groove 117 in the sheath 91 is merely a continuation of the groove 82 in the sleeve 72, when the sheath has its lug 90 in the longitudinally open slot 86.

The end 118 of the sheath 91 (FIG. 3) is plane, fitting against the end 119 of the sleeve 72.

Figure 22:
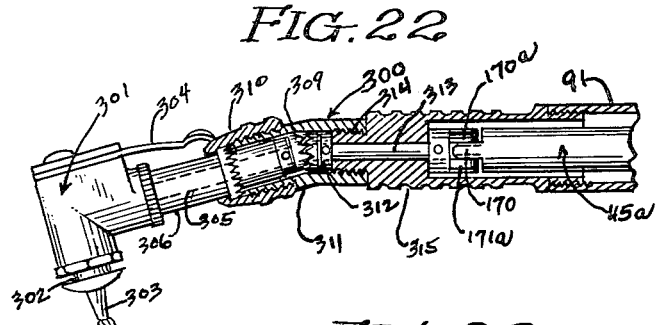
FIG. 22 is a fragmentary sectional view of the contra angle structure at the left end of FIG. 9.

Referring to FIG. 22, this is a fragmentary view showing the left end of the handpiece, when the sheath 91 is equipped with a high speed contra angle attachment. This contra angle includes the right angle housing 301, having rotating sleeve 302, receiving the shank of a bur 303 or other tool, and retained by pivoted retainer 304.

The sleeve 302 is driven by bevel gears (not shown) in housing 301, one gear being on shaft 305, which is rotatably mounted in tube 306, threaded in housing 301. The end of tube 306 has an annular head, with axial teeth, drawn against similar teeth on the end of knee housing 309, by threaded collar 310. This housing 301 may be secured at any angle by rotating it in collar 310.

Shaft 305 has a gear 311 with axially beveled teeth pinned to it for driving a similar gear 312 carried by shaft 313. Knee housing 309 is externally threaded for collar 310 and internally threaded to receive threaded end 314 of extension 315 in which shaft 313 rotates. Shaft 313 carries a driven member having axial lugs 170a, 171a to engage driving lugs 170.

Figure 23:
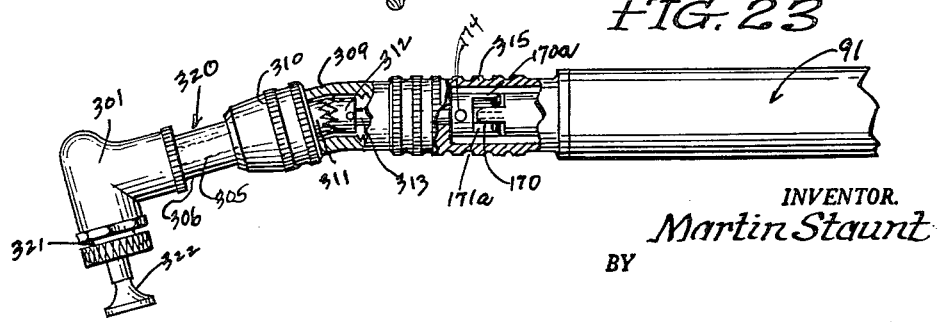
FIG. 23 is a fragmentary sectional view of the dental plugger which may be attached at the left end of FIG. 9.

Referring to FIG. 23, this is a fragmentary view showing the handpiece when equipped with a quickly removable high speed dental plugger 320. The dental plugger is attached to a similar sheath 91 in the same manner as the preceding contra angle. Its right angle housing contains a sleeve 321 for sliding movement and for supporting the shank of a plugging or tamping tool 322.

The shaft 305 of this attachment carries an eccentric dog or hammer which engages a radial flange on sleeve 321 (not shown) and imparts hammer blows to the sleeve 321 and tool 322. The rest of the structure is the same as the preceding one and bears similar numerals.

Any number of sheaths bearing attachments, of which these are examples, may be provided and quickly detached or attached by the user in a few seconds. The drive by loosely engaging lugs 170, 171, and 170a, 171a, is found to reduce vibration to a minimum at high speeds, as shown by the lower curves in FIG. 20.

The operation of these parts is as follows:

When the actuating member 100 is rotated until the band 92 slides rotatably out of the shallow groove 117 in locking extension 90, the sheath 91 may be slid axially away from the sleeve 72 and detached. The unlocking rotating motion of the band 92 is limited by edge 93 striking stop 108.

With the parts in this position the same sheath or another sheath may be slid over the spindle and may have its lug 90 slid endwise into the open-ended slot 86, of the sleeve 72, until the end surfaces 119 of sleeve 72 and 118 of sheath 91 are in engagement.

Then the edges 115 and 116 of lug 90 will be engaging the edges 87 and 88 of the slot 86 in sleeve 72 to prevent rotation of the sheath on the sleeve.

At this time the shallow groove 117 in the sheath extension 90 will register with the shallow groove 82 of the sleeve 72, and the locking band 92 may be rotated by its actuating member 100, the band 92 sliding in its present groove 82 and also across the lug 90 in the groove 117, until the end 94 of band 92 engages stop 108. Then the band 92 locks the extension lug 90 to the sleeve 72; and it is also held in alignment by the inner surface 99 of actuating member 100.

The sheath 91 is also held in accurate concentric alignment with the sleeve 72 by being slidably mounted on the integral tubular part 68, which extends to the left in FIG. 1, from the housing 36 and is adapted to support the bearing assembly 120 at the tool end of the handpiece.

The tube 68 has the outer cylindrical surface 73, previously described, engaging the inner bore 74 in sleeve 72, and also engaging the inner bore 121 in sheath 91.

Thus the sheath 91 and sleeve 72 together constitute a rotatable external handle on the handpiece, which, being rotatable on the tube 68, permits the wrist joint 25 to hang downward when the sheath 91 is supported by the hand of the user.

The tube 68 is provided at its left end (FIG. 2) with a larger counterbore 122 for receiving the roller bearing assembly 120.

This roller bearing assembly comprises an outer tubular race 123, having a cylindrical outer surface 124 with a frictional fit in the counterbore 122.

The outer race 123 has an inner cylindrical surface 125 engaged by the rollers 126, of which there are sufficient to extend all the way around the inside of the bore 125, with a clearance between roller surfaces.

The rollers 126 are hardened steel members having the external cylindrical surface 127 and plane end surfaces 128 at the end of a concave tapered surface of revolution 129, forming an axial pin at each end of the roller.

The external race 123 is threaded internally at 131, 132 at each end. Each end is provided with a combined internal race and thrust collar 133, 134. Each thrust collar has an internal bore 135 with a clearance about the spindle 45.

Each collar 133 has an external cylindrical surface 136 which is cylindrical and flush with the inner surface 124 of the outer race 123.

Each collar has an outer threaded surface 137 which may be threaded into the threaded bores 131, 132. Each collar has an annular thrust surface 138 for engaging the ends 128 of the rollers 126.

Each collar has an inwardly projecting tubular flange 139, flush with the inner bore 135, and having its outer cylindrical surface 140 spaced from the concave outside 129 of each pin 130 on each roller 126. Thus there is no contact between the sides of pins 130 and the retaining flange 139 which holds the rollers in the outer race 123.

The space between the inner bore 125 of the outer race 123 and the cylindrical surface 141 on spindle 45 is occupied by the rollers 126, whose cylindrical surfaces 127 rotatably support the spindle at its cylindrical surface 141 in the bore 125 of the outer race 123.

The cylindrical surface 141 has a heavy deposit of hard chromium plating to increase the bearing life greatly.

The spindle 45 comprises a tubular metal member having the outer cylindrical surface at its left end (FIG. 2) extending to the annular shoulder 142 to the right of the roller bearings. From this point the spindle is enlarged and has the outer cylindrical surface 143 provided with a clearance 144 inside the bore 121 of the tube 68.

The spindle is supported at its right end by the ball bearing assembly, where the spindle has a reduced cylindrical surface 51; and the inner race 49 is held against shoulder 52 by a spacing tube 46 (FIG. 1), which is engaged at its other end by the pulley 146.

Pulley 146 is mounted on a reduced cylindrical portion 147 of the spindle 45 and is held on this reduced portion 147 by a threaded bushing 148 having a knurled head 149 with flat sides for reception of a wrench.

The bushing 148 has an annular surface 150 engaging the pulley 146; and the bushing has an external thread 151 on a reduced portion which is threaded into a threaded bore 152 in the spindle 45.

The spindle has a key 153 disposed in a keyway in the pulley 146 and the spindle and preventing rotation of the pulley on the spindle. The pulley is formed with a plurality of pheripheral grooves 154 and 155 of different diameter, separated by radially extending flanges; and the grooves are tapered for engaging a belt in the form of a cord which engages the sides of the pulley, or in some cases engages a curved bottom of the pulley groove.

The pulley is concave at its inner side 156 so that it extends about the collar 38 and prevents the ingress of dirt and moisture into the bore 44.

The bushing 148, which secures the pulley on the spindle, is also provided with a threaded bore 157 for receiving the threaded portion 158 of a chuck actuating rod 159, which extends through the bore 160 in the spindle 45 and protrudes from the bushing 148, where it is provided with a metal actuating knob 161, having a threaded bore 162 tightly threaded on portion 158 and provided with a knurled edge 163.

The knob 161 is adapted to rotate the chuck rod 159 in the bushing 148, causing it to engage the collet actuating member 164 by means of its end 165. Conversely the rod 159 is adapted to release the chuck by being moved to the right.

The rod 159 is guided by a bushing 166, having a tight frictional fit in bore 160 of the spindle 45 to prevent whipping of this end of the rod; and the end surface 165 of the rod is partially spherical.

The spindle 45 is rotatably mounted at its left end by the roller bearings and has the reduced cylindrical part which has a continuation of the bore 160 for housing a collet 167. The bore 160 has a frusto-conical surface 168 at its end which communicates with a smaller counterbore 169; and the spindle has a pair of longitudinal driving extensions 170, 171 comprising lugs extending longitudinally of the spindle and forming a continuation of the spindle wall from the bore 169.

The lugs have flat radially extending sides 172 and a flat end 173 with beveled corners, and are intended to be used for driving similar lugs on a driven member 174 (FIG. 9), which driven member is adapted to drive a contra angle.

The collet 167 comprises a substantially cylindrical member having the external cylindrical surfaces 175, 176 at each end and another cylindrical surface 177 midway between the ends with reduced portions 178 and 179.

The cylindrical surfaces 175-177 fit in the bore 160 which guides the collet; and the collet is provided with a plurality of inwardly extending slots 180 at each end and with an internal bore 181 at each end, said bore having a substantial fit with the shank of a bur or other tool to be secured in the collet.

The collet actuating member 164 (FIG. 2) comprises a cylindrical member sliding in the bore 160, and having a frusto-conical cavity 182 leading to a bore 183 for receiving the conical end 184 of the collet.

The collet has a frusto-conical end surface 185 at its outer end engaging in the frusto-conical bore 168.

The operation of the collet is as follows:

The collet bore 181 is already a substantial fit on the shank of the bur or other tool. When the push rod is threaded clockwise, it moves this rod 159 to the left, pushing the collet actuating member 164, and the conical surfaces 168 and 182 cause a contraction of the ends of the collet by engaging the outer conical surfaces 185 and 184.

The slots 180 contract and the collet resiliently grips the shank; but upon moving the rod 159 in the opposite direction, the collet springs back to non-gripping position.

The sheath 91 has its working end provided with a reduced tapered portion 186, which has a further tapered surface at 187 containing the bore 188, which houses the collet and leading to a smaller end bore 189 for passing the tool shanks.

The tapered end 186 is adapted to receive the complementary tapered socket of a contra angle or other attachment, which has a shaft that extends into the chuck and is gripped thereby while the external housing is mounted on tapered nose 186.

The sheath 91 has its tapered nose 186 provided with a longitudinally extending lug 190 projecting from surface 186 beyond the annular shoulder 191; and the lug 190 has a rounded end 192 and parallel edges so that this sheath may receive the contra angle housings as previously constructed. The lug 190 prevents the rotation of the housing on the sheath.

Referring to FIGS. 1 and 12, these views show the wrist joint and its pulleys. The hinge member 22 has a flattened end portion 193, which is pivotally mounted in a slot in a flat body 194 by means of a screw bolt 195 passing through the flattened end and threaded into a threaded bore.

A pin 196 extends across the slot 197 and is adapted to engage a stop shoulder 198 or 199 on either of the hinge members 22 or 200. The second hinge member 200 has its flattened end 201 mounted in slot 197 on screw bolt 202 threaded into bore 203, both of these mountings being alike.

The body 194 has a through bore 204 for receiving a shaft 205 for supporting the pulleys 206, which are identical. Shaft 205 is held in bore 204 by a set screw 207 and projects laterally from each side of the body 194.

Each end of the shaft is provided with a reduced cylindrical portion 208, forming a groove, and bounded by annular shoulders 209 and 210. A plurality of hardened steel cylindrical rollers 211 are mounted in said groove and inside the bore 212 in each pulley. Each pulley has a larger threaded end bore 213 and 214, and a thrust bushing 215 is threaded in each end of the pulley and provided with a plane thrust surface 216 engaging the rounded ends of the rollers.

Each bushing has an annular flange with a surface 217 seated against the end 218 of the pulley. Shaft 205 has a through bore with threads 219 at each end for receiving the threaded shank 220 of a guard 221, comprising a circular member carried by the threaded shank 220, and having an inwardly curved surface 222 carrying a cylindrical flange 223, which overhangs the edge 224 of the pulley.

The pulley has a round tapered groove 225 between the projecting edge portions 224 and 226. The hinge member 200 is preferably provided with an anti-shock mounting, indicated at 227 in FIG. 12, for the purpose of preventing the transmission of vibration from the engine through this part of the supporting mechanism to the handpiece.

This involves a longitudinally extending rod 228, having a cylindrical bore 229 at one end for receiving a rod carried by the engine mechanism and fitting in the bore 229. The rod 228 has a longitudinally extending lug 230 to engage in a slot on the engine part, and has a leaf spring 231 secured to its side by screw bolt 232 and provided with an inwardly projecting end portion 233 passing through aperture 234 for engaging a shoulder or groove or aperture on the adjacent part that is inserted in the bore 229.

A headed pin 235 is mounted in a bore 236, with its head 237 below the leaf spring 231 in a counterbore 238. Thus the spring keeps the pin in place; and the protruding end 239 of the pin may be pressed to release the rod in bore 229.

The other end of the cylindrical rod 228 has a cylindrical bore 240, containing a live, resilient rubber bushing 241, which is provided with a laterally extending flange 242 engaging the end of rod 228.

Resilient bushing 241 has a bore 243 receiving the reduced rod portion 244 with a tight fit; and the rod portion 244 is an integral part of hinge member 200, which has an annular shoulder 245 engaging the resilient flange 242.

The parts are held in assembly by a screw bolt 232, which passes through a bore 246 in the rod 228 and is threaded into the bore 247.

Screw bolt 232 has its shank 248 surrounded by a live, resilient rubber sleeve 249, which is located in a bore 250 in the hinge member 200, and also extends to the sides of bore 240. Thus the hinge member 200 is separated from the part 228 without metal to metal contact; and vibration will not be transmitted to the handpiece from the engine mechanism, being absorbed by the rubber 241 and 249.

The present handpiece is adapted to be used with various attachments, one of which is exemplified in FIG. 9, showing a high speed contra angle attachment. This figure shows another sheath 91a, the right end of which is similar to the sheath 91, previously described.

This sheath 91a is quickly attachable and quickly detachable from the rest of the handpiece shown in FIG. 1 by substituting for it the sheath 91.

Sheath 91a has its bore 121 provided with internal threads 251 for receiving the threaded reduced portion 252 of the contra angle attachment 253. This attachment has the grooved and knurled lands 254 on its outer surface and is provided with an end bore 255, which forms an extension of the bore 121 of sheath 91a.

The attachment 253 has an annular shoulder 256 seating against the end 257 of the sheath 91a; and it has a bearing bore 258 in its opposite end for rotatably supporting a shaft 259.

Shaft 259 supports a driven member 174 at its right end (FIG. 9), which comprises a cylindrical body 260, having a bore 261 to receive the shaft 259. A pin, riveted in the bore and the shaft, secures the driven member 174 on the end of the shaft.

Bore 255 has an annular end surface 263 engaged by thrust surface 264 on driven member 174. Driven member 174 has longitudinally projecting lugs 170 and 171a of the same length as the lugs 170 and 171 in FIG. 2. These lugs have the radially extending sides and beveled ends and occupy only a portion of the periphery of the cylindrical body 260. As distinguished from lugs 170 and 171, which have radial edges 145, the lugs 170a, 171a are wider in a radial direction and thinner in a peripheral direction, with parallel sides 145a.

The lugs 170 and 171 can be seen in FIG. 9, located between lugs 170a and 171a, with a loose connection. Thus the spindle of the handpiece with its lugs 170 and 171 is adapted to drive the shaft 259 by their engagement with the lugs 170a and 171a.

There is sufficient looseness between the parts of this drive so that vibration of the universal joint structure is substantially eliminated; and it is found that the contra angle shaft 259 may be driven at a high speed with a minimum amount of vibration when this kind of drive is employed.

Referring to FIG. 11, this is a modification showing the spindle supporting tube 68a when it is equipped with a spindle 45a mounted on ball bearings at this end.

The tube 68a has a bore 121a and a counterbore 265 at its end. The counterbore 265 is adapted to receive the ball bearing outer races 266 with a tight frictional fit; and this assembly includes two inner races 267 and a multiplicity of balls 268 between the races. The inner races have an inner bore 270 fitting about the spindle 45a. The bore 272 is threaded to receive the threaded thrust collar 275.

This assembly will fit in the same place in the handpiece 20 of FIG. 1, where the tube 68 and spindle 45 is located; but it is mounted with ball bearings instead of roller bearings.

The driving attachment 253 has its shaft extending through a reduced portion 278 and provided with a gear 279 pinned to the shaft at 280, and having tapered end teeth. These engage similar teeth on a gear 281, forming a part of a contra angle 282 or part of an attachment for packing and hammering amalgam into a cavity.

Referring now to FIGS. 17-20, inclusive, these figures show graphically the results accomplished by the use of the present improved handpieces at high speeds at from 12,000 r.p.m. to 25,000 r.p.m. or more.

FIG. 17 shows the time in minutes indicated on the ordinate plotted against r.p.m. indicated on the abscissa to show the reduction in minutes' time which is accomplished by use of higher speeds in full crown preparations. This curve shows that at 6,000 r.p.m. it took slightly under forty minutes to prepare for a full crown, while at speeds of over 20,000 r.p.m. it took about ten minutes.

Figure 18:
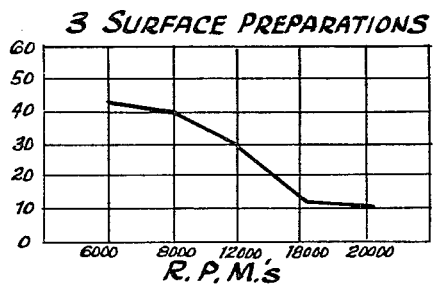
FIG. 18 is a reproduction of a graph showing reduction in time used for three surface preparations at higher speeds.

FIG. 18 shows a similar curve on surface preparations and a similar reduction in the time required when high speeds over 20,000 r.p.m. are used.

Figure 19:
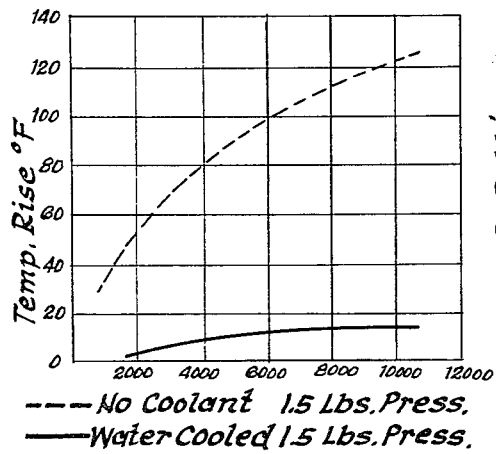
FIG. 19 is a reproduction of a graph showing temperature rise at higher speeds, with and without use of water coolant.

In FIG. 19 temperature rise in degrees F. is plotted against r.p.m.; and the upper line shows the increase in temperature with increase in speed without the use of coolants. The lower curve shows the much less rise in temperature with increased speeds when the tool and tooth are water cooled.

Figure 20:
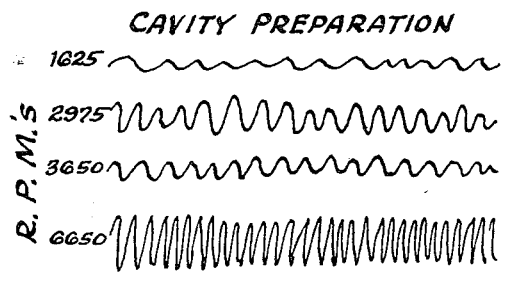
FIG. 20 is a reproduction of vibration curves on an oscilloscope of handpieces operating at various rotative speeds.

FIG. 20 shows oscillograph curves indicating the vibration which is produced by the handpiece and contra angles of the prior art when used at speeds of from 1,625 r.p.m. to 6,650 r.p.m.; and the reduced vibration is illustrated in the lowermost line at the speed of 9,950 r.p.m., using the improved handpiece structures described above.

Referring to FIG. 24, this is a fragmentary sectional view similar to FIG. 1, but showing only the tool end of a modified form of dental handpiece.

This modification differs from FIG. 1 in that the roller bearings 120 at the nose end of the spindle have been replaced with ball bearing assemblies 350 of the type illustrated in FIGS. 34–38 herein; and the ball bearing assemblies are mounted in a different manner to reduce the number of parts and the number of machine operations and to permit the entire spindle assembly to be removed for cleaning, as shown in FIG. 26, with the ball bearings mounted thereon.

In this modification similar parts bear similar numerals; and the sheath 91 is similar in construction to that previously described, being rotatably mounted upon the tube 68, which is a tubular extension of the elbow bearing housing 36 carried by the elbow 25.

The rotatable sheath 91 has an enlarged bore at its left end for receiving the tapered nose portion 186, which has a frictional fit in the end of the sheath 91 and has a continuation of the bore 121 in the sheath, being rotatably mounted upon the tube 68.

In this modification the tube 68 is provided with a smooth bore 67 for slidably receiving the outer race of the ball bearing assembly 350, the inner race of which is frictionally and fixedly mounted on the spindle 45.

The spindle 45 has an outer cylindrical surface 143 and a reduced cylindrical portion 141, terminating at an annular shoulder 351, against which the inner race 352 is seated; and the inner race 352 has a tight frictional fit on the reduced portion 141.

Referring to FIGS. 34–38, these are views showing the details of construction of the ball bearings, which are preferably used at both ends of the handpiece instead of the roller bearings 120 and the ball bearings 49 disclosed in FIG. 1.

The ball bearing assembly 350 includes an outer race 353 and an inner race 352. The outer race has an outer cylindrical surface 354 and an inner cylindrical surface 355 and plane ends. The inner cylindrical surface 355 has the ball groove 356, which is continuous and without filling openings and formed on a radius larger than the radius of the balls 357. This gives the balls single point contact in the race grooves.

The ball bearing assembly is provided with a lesser complement of balls than is necessary to fill the grooves so that the balls are spaced equally from each other out of contact with each other. The balls are held in this position by the plastic ball retainer 360, shown in elevation in FIG. 35.

The ball retainer 360 comprises a short nylon tube, the ends of which terminate inside the ends of the races; and the internal and external diameters are such that there is a clearance between the ball retainer 360 and each of the races.

The ball retainer 360 has a cylindrical bore 361 for each of the balls; and the bore is slightly larger than the ball diameter. Each ball supporting bore 361 opens at one side into a parallel walled slot 362, which is slightly narrower than the ball diameter, so that the slots 362 may be forced over the balls until the balls are lodged in the bores 361, as shown in FIG. 34.

Th races and balls are assembled by locating the races eccentrically with respect to each other so that they are spaced at one side sufficiently to receive the balls. After the balls are in the grooves of both races the balls are then distributed equally and the balls are suitably supported from the lower side, while the ball retainer 360 is pressed over the balls from the top side, each ball going into its bore, where it is retained by the restriction of the slots 362, which holds the retainer on the balls, the balls in turn being retained by the grooves.

The retainer prevents the balls from striking each other and permits the lubrication of the ball bearings by the use of air containing a lubricant mist or by immersing the bearing in liquid lubricant.

A similar ball bearing is used at the rear end of the handpiece, where the ball bearing assembly is indicated by the numeral 363 (FIG. 25).

The present modification is similar in construction to FIG. 1 at the rear end, where the bearing housing 36 carries the forwardly extending tube 68, which rotatably supports the sheath 91. The sheath 91 comprises two sections; and the rear section comprises a sleeve 72 fixedly secured to the front section by the rotatable joint structure 82, shown in FIG. 1.

The rear section 72 has a radially extending annular flange 77 engaging an annular shoulder at 76 and secured by means of a threaded collar 70 which has the threads 66 for securement to the housing 36, but permitting free rotation of the sheath assembly 91, 82, 72.

The spindle 143 extends through the rear section of the handpiece, where it has an annular shoulder 364 and a reduced end portion 365.

The inner race of the ball bearing assembly 363 engages the shoulder 364, and in turn is engaged by the metal sleeve 46, which is engaged by the pulley 140. The pulley 140 has the bore receiving the reduced end 365 of the spindle and is provided with a key and key-way and held on the spindle by a threaded plug 148, which has a smooth bore 366 for passing the chuck rod 367 having a knob 368.

The chuck rod extends through a sleeve 369 inside the spindle 45 to a point near the tool end of the handpiece, where it has a threaded portion 370 in a threaded bore 371 and a cylindrical head 372 for engaging the chuck follower 373, which has a conical recess 374 engaging the collet 375.

The collet has slots 117 in each of its ends and has a conical end 376 engaging in a conical recess 377 whereby the collet may be contracted upon its central bore (not shown) for clamping the shank of a tool. All the details of the chuck may be substantially as described with respect to FIG. 1.

The outer race of the ball bearing assembly 363 is engaged in a bore 378 in the housing 36 with sufficient looseness to be removed with the spindle. The outer race engages an annular shoulder 379 and is secured by threaded collar 380, which has a land 381 engaging the outer race, but has a clearance 382 with respect to the inner race and with respect to sleeve 46.

The spindle and both ball bearing assemblies 350 and 363 may be removed with the collar 380 and the pulley 140 and chuck rod 367 by merely unscrewing the collar 380 so that the spindle assembly, as shown in FIG. 26, may be removed and cleaned and sterilized.

Figure 21:
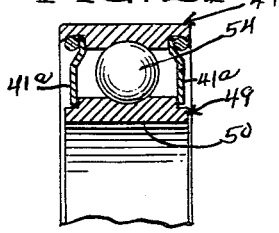
FIG. 21 is a fragmentary enlarged sectional view of the ball bearing assembly used at the right end of FIG. 1.

Referring to FIGS. 27 and 28, these are views showing the details of a ball bearing contra angle attachment which may be attached to the handpiece of FIG. 21 or FIG. 24, after the manner shown in FIG. 22. This contra angle attachment includes an elbow 383 having a threaded bore 384 adapted to receive the threaded end 385 of the short attachment sleeve of FIG. 30 or of the longer attachment sleeve 386 of FIG. 29.

The elbow 383 has a bore 387 at an obtuse angle large enough to receive the toothed gear 388 and provided with an aperture 389 to which a plastic hose may be attached to supply the contra angle with lubricant in the form of a mist carried by air. The elbow has a threaded bore 390 for attachment to the contra angle sleeve 391, which has a threaded end 392.

The contra angle sleeve 391 has a through bore 393 communicating with a counterbore 394, which provides an annular shoulder 395 for engaging the outer race of the ball bearing assembly 396.

All the ball bearings employed in the handpiece and attachments and contra angle are preferably of the type shown in FIGS. 34–38, with spaced balls and a ball retainer holding the balls in a continuous groove without filling slots.

The outer race of the ball bearing assembly 396 is seated against the shoulder 395 in the counterbore 394 and may be frictionally held therein, while the inner race may be frictionally mounted on the shaft 397 and confined against removal by the gear 398, which is pinned to the shaft and adapted to engage gear 388.

The sleeve 391 has an annular shoulder 399 engaging the end of elbow 383 and is provided at its other end with a similar threaded portion 400 adapted to be received in the threaded bore 401 in the contra angle head 402.

In this case the sleeve 391 has an annular shoulder at 403 clamping a plate 404 against the annular shoulder 405 on the head, the plate having an aperture to receive the threaded end 400. The plate 404 has a lateral extension 405 (FIG. 28) having a bore for receiving the twin air and water pipes 406, 407, which are brazed in the extension 405 and held thereby, with nozzle ends 408 and 409 directed toward a tool carried by the contra angle.

The diverging ends 410, 411 of the tubes are provided with the flexible plastic air and water hoses (not shown).

The threaded plug 400 has a counterbore 412 for frictionally receiving the outer race of the ball bearing assembly 413; and the inner race is again mounted on the end of shaft 397, where it is held by the balls and retainer and by the gear 414 that is pinned to the shaft.

The contra angle head 402 has a bore 415 extending at right angles to the bore 40 and provided with an annular shoulder 416 at its upper end for engaging the outer race of ball bearing assembly 417.

A sleeve 418 acts as a spacer at the outer races of ball bearing assemblies 417 and 419; and the race 419 is engaged by a threaded plug 420 in a threaded bore 421; but there is a clearance at 422 between plug 420 and the inner race.

The shaft 423 comprises a hollow tube having an internal bore 424 with an inwardly extending lug 425 for engaging a flattened portion on a tool shank. A pivoted lever 426 is pivoted on screw 427 and swings in a slot 428 to bring a laterally open slot 429 into a groove in the tool shank to retain the tool shank in the shaft bore 424. The shaft 423 has a reduced portion receiving at each end the inner races against annular shoulders; and the races may be fixedly secured on the shaft, which has a bevel gear 430 engaging bevel gear 431 on shaft 397.

The inner races of ball bearing assemblies 417 and 419 have a tight frictional fit on the tubular shaft 423; and the sleeve 418 is cut away at one side toward the right in FIG. 27 to clear the bevel gear 434. The threaded plug 420 has a clearance about the shaft 423 so that the shaft may rotate freely with the inner races.

Referring to FIG. 29, this attachment is known as the long sleeve attachment, in which a long shaft 436 has a threaded bore 437 for attachment to a threaded end portion 438 on a relatively short attaching sleeve 439. Sheath 436 corresponds to the nose section 91 of the sheath in FIG. 24 and may be attached to the handpiece after the removal of sheath section 91 by rotating the attachment sleeve 82.

The spindle 45 is indicated in dotted lines and is provided with the axially projecting lugs 170, 171, only one which is seen in FIG. 29.

The body of sleeve 439 has a through bore 440 serving as a bearing for a shaft 441, which has the gear 388 pinned on one end and a driving fitting 174 pinned on the other end. The driving fitting has the axially extending lugs 170a and 171a, previously described, between which the lugs 170 and 171 on the spindle 45 are received.

The present driving connection differs from that shown in FIG. 9 in that the lugs 170a, 171a are surrounded by a coil spring 442, which tends to maintain their alignment and improves the smooth running qualities of the joint.

Spring 442 has an inwardly turned radial end 443 anchored in a complementary bore in the fitting 174 so that the spring 442 always remains on the coupling member 174 when the sleeve 436 and the spindle are removed.

Referring to FIG. 30, this is an example of the short sleeve attachment, which can be directly attached to the handpiece of FIG. 24. This short sleeve attachment comprises a tapered body 444, which has the reduced threaded end 385 receivable in the threaded portion 384 of the contra angle attachment of FIG. 27.

The body comprises a solid portion 445 having a through bore 446 forming a bearing for the shaft 447, to which gear 448 is pinned. The shaft is held in its bearing by a thrust collar 449, having a tight frictional fit on the shaft and engaging the base 450 of a bore 451, which communicates with a tapered bore 452 that fits on the tapered nose 186.

The body 444 terminates in an annular collar 453, which has an axially extending slot 454 separated by adjacent resilient portions 455 and 456, which are separated from the body by a peripheral slot 457.

The collar 453 fits about the body of the sheath 91, while the tapered portion 452 fits on the nose 186; and the shaft 447 projects into the chuck collet 375, where it is gripped.

The slot 454 fits on either side of a lug 458 (FIG. 24) carried by the nose 186.

Referring to FIG. 31, this is a fragmentary sectional view of a contra angle high speed attachment, into which there is a three to one ratio between the driven gear 459 and the driving gear 460.

The body 461 of this attachment corresponds to the sleeve 391 of FIG. 27 and has a bore 462 forming a bearing for a shaft 463, to which the driven gear 459 is pinned at 464. The body 461 terminates in a threaded portion 465 adapted to be received in the threaded end 466 of an enlarged elbow housing 467.

The elbow housing 467 has a tapered portion 468 extending at an obtuse angle at its threaded bore 469, which receives a threaded plug 470, terminating in a sleeve 471. Sleeve 471 has a bearing for the shaft 473, to which the small gear 460 is pinned.

Sleeve 471 corresponds to the sleeve 439 of the long attachment or the sleeve 444 of the short attachment of FIGURES 29 and 30. By means of this triple speed gear drive the contra angle may be driven at three times the rate of rotation of the spindle 45.

Referring to FIGS. 32 and 33, these are fragmentary views of the idler pulleys assembly, showing a modification of FIG. 12. In this modification the construction is similar to FIG. 12 except that the new construction includes improved arrangements for lubrication.

The idler pulleys are mounted on the same arms 22 and 200 of FIG. 12; and the hinged body 194 is pivotally secured to said body by screw bolts 474 and 475. The hinged body 194 has a through shaft 476 secured in a bore 477 by a set screw 478.

The set screw 478 has a bore 479 for the entrance of lubricant.

The shaft 476 has a through bore 480, which is threaded at each end to receive the threaded shank of the pulley guards 481, 482.

The pulleys differ from those shown in FIG. 12 in that they are provided with a guard flange 483 extending toward the hinged body 194 so closely that no belt can enter the groove 484.

Each pulley has a through bore 485 serving as an outer race for the rollers 486, which are held in the pulley by a pair of washers 487, 488 for each pulley, the washers engaging the ends of the rollers 486, and being in turn engaged by the threaded collars 488, which are threaded into threaded end portions of each bore 485.

Each roller assembly is lubricated by lubricant coming from the bore 480 through radial bores 490.

The pulley guards 481, 482 have their convex ends provided with oval kidney shaped apertures 491, 492, 493 (FIG. 32) which are found to reduce the noise level and to effect a cooler running of the idler pulley assembly.

The modifications which are shown in the new FIGURES 24-36 include the improvements not shown in the original parent application, Ser. No. 494,607, of which this is a continuation-in-part.

It will thus be observed that I have invented improved dental handpieces adapted to be operated at speeds of 25,000 R.P.M. and higher; and these handpieces operate with a minimum amount of vibration and at lighter pressures and reduce the time for cavity preparation to a fraction of that required using the devices of the prior art, which could not be rotated at such high speeds.

My improved handpieces may be used with a plurality of interchangeable attachments, each of which is carried by a separate sheath in such manner that the sheath and attachment may be released by merely turning a collar and pulling; and another attachment may be substituted by being slid into the same place and secured by turning the collar.

This permits the same handpiece structure to be used with a multiplicity of attachments, each of which has its sheath quickly attachable or detachable from the rest of the handpiece.

While I have illustrated a preferred embodiment of my invention, many modifications may be made without departing from the spirit of the invention; and I do not wish to be limited to the precise details of construction set forth, but desire to avail myself of all changes within the scope of the appended claims.

Having thus described my invention, what I claim as new and desire to secure by Letters Patent of the United States, is:

1. In a high speed dental handpiece, the combination of a support with an elongated external sheath rotatably mounted on said support, a tubular metal member in said sheath, antifriction bearings carried by one end of said tubular member, antifriction bearings carried by the other end of said tubular member, a spindle rotatably mounted in said sheath in said antifriction bearings, said spindle being provided with a pulley at one end and being provided with a driving connection at the other end for driving dental tools, said driving connection being located inside said shearth, and being in alignment with an aperture for tool shanks, said sheath being provided intermediate its ends with a separable joint, the major portion of the tool end of said sheath being quickly detachable, and means for locking said quickly detachable portion of said sheath on the other portion of said sheath, said latter means comprising a manually rotatable collar and a circumferentially extending open band carried by said collar rotatably mounted in aligned grooves in both parts of said sheath to lock the parts together or to release them.

2. In a multipurpose dental handpiece, the combination of a wrist joint member having an elongated tube carried thereby, a spindle rotatably mounted in said tube and having a chuck at one end, said spindle also terminating in a pair of longitudinally extending drive lugs, a sheath assembly rotatably mounted on said tube, said sheath including a shorter end portion adjacent said wrist joint, and a longer portion adjacent said chuck, said sheath having an opening in its end for insertion of tool shanks into said chuck, the parts of said sheath being separable so that the longer portion of said sheath may be removed and any of a plurality of similar elongated sheath portions may be substituted, carrying different forms of tool ends, and rotatable means for locking said sheath portions together comprising an actuating collar and a rotating band under said collar, said band being open at one side for release of the longer portion of said sheath, and said band being located in circumferential grooves extending about both of said sheath portions.

3. In a multipurpose dental handpiece, the combination of a wrist joint member having an elongated tube carried thereby, a spindle rotatably mounted in said tube and having a chuck at one end, said spindle also terminating in a pair of longitudinally extending drive lugs, a sheath assembly rotatably mounted on said tube, said sheath including a shorter end portion adjacent said wrist joint, and a longer portion adjacent said chuck, said sheath having an opening in its end for insertion of tool shanks into said chuck, the parts of said sheath being separable so that the longer portion of said sheath may be removed and any of a plurality of similar elongated sheath portions may be substituted, carrying different forms of tool ends, and rotatable means for locking said sheath portions together comprising an actuating collar and a rotating band under said collar, said band being open at one side for release of the longer portion of said sheath, and said band being located in circumferential grooves extending about both of said sheath portions, one of said sheath portions having a longitudinally extending slot extending beyond said groove into said latter sheath portion, and the other of said sheath portions having a longitudinally extending lug formed with said groove and extending into said slot to prevent relative rotation between said sheath portions.

4. In a multipurpose dental handpiece, the combination of a wrist joint member having an elongated tube carried thereby, a spindle rotatably mounted in said tube and having a chuck at one end, said spindle also terminating in a pair of longitudinally extending drive lugs, a sheath assembly rotatably mounted on said tube, said sheath including a shorter end portion adjacent said wrist joint, and a longer portion adjacent said chuck, said sheath having an opening in its end for insertion of tool shanks into said chuck, the parts of said sheath being separable so that the longer portion of said sheath may be removed and any of a plurality of similar elongated sheath portions may be substituted, carrying different forms of tool ends, said elongated tube being provided at its end adjacent the tool end of said handpiece with an external race on its inside comprising a tubular member having an internal cylindrical surface and threaded internally at each of its ends, a plurality of rollers mounted against said cylindrical surface in said race and engaging said spindle, and thrust collars threaded in each end of said race and having a clearance with respect to said spindle, said thrust collars limiting the axial movement of said rollers, each of said thrust collars being provided with an inwardly extending annular retaining flange adjacent said spindle for extending over an axially extending part on each roller and preventing the rollers from dropping out of said race when the spindle is removed.

5. In a multipurpose dental handpiece, the combination of a wrist joint member having an elongated tube carried thereby, a spindle rotatably mounted in said tube and having a chuck at one end, said spindle also terminating in a pair of longitudinally extending drive lugs, a sheath assembly rotatably mounted on said tube, said sheath including a shorter end portion adjacent said wrist joint, and a longer portion adjacent said chuck, said sheath having an opening in its end for insertion of tool shanks into said chuck, the parts of said sheath being separable so that the longer portion of said sheath may be removed and any of a plurality of similar elongated sheath portions may be substituted, carrying different forms of tool ends, a jointed rod for supporting said wrist joint, said jointed rod being provided adjacent its end with a second supporting rod carried by the dental engine, and a resilient rubber non-metallic joint between said supporting rod and jointed rod for preventing transmission of vibration from one rod to the other from engine to handpiece.

6. In a multipurpose dental handpiece, the combination of a wrist joint member having an elongated tube carried thereby, a spindle rotatably mounted in said tube and having a chuck at one end, said spindle also terminating in a pair of longitudinally extending drive lugs, a sheath assembly rotatably mounted on said tube, said sheath including a shorter end portion adjacent said wrist joint, and a longer portion adjacent said chuck, said sheath having an opening in its end for insertion of tool shanks into said chuck, the parts of said sheath being separable so that the longer portion of said sheath may be removed and any of a plurality of similar elongated sheath portions may be substituted, carrying different forms of tool ends, a jointed rod for supporting said wrist joint, said jointed rod being provided adjacent its end with a second supporting rod carried by the dental engine, and a resilient rubber non-metallic joint between said supporting rod and jointed rod for preventing transmission of vibration from one rod to the other from engine to handpiece, said non-metallic joint comprising a pair of telescoping members forming part of said rods, and a resilient rubber sleeve between said telescoping members for preventing metallic contact between them.

7. In a dental handpiece, a supporting tube and a rotating spindle mounted in said tube, said spindle having an external cylindrical surface, and said tube supporting a plurality of rollers for engaging said surface, an outer race located in a counterbore in said tube and having an inner cylindrical surface engaging said rollers, said outer race being threaded internally at each of its ends, and a pair of thrust collars engaging the ends of said race and having reduced threaded portions threaded in each end of said race for preventing said rollers from moving axially beyond said collars, said rollers each being provided with concavely formed axial points at each end, and an annular flange carried by each of said thrust collars and located inwardly of said points on said rollers but having a clearance with regard to said points, said flange preventing the rollers from dropping out of said race when the spindle is removed.

8. A dental handpiece adapted to drive dental burs and to drive contra angles having a drive shaft like a dental bur, and adapted to drive other high speed contra angles, comprising a hollow spindle having an axial opening at one end and provided with a collet chuck for grasping tool shanks or driving pins of contra angles, said spindle also having a pair of axially extending diametrically opposite drive lugs, and a dental attachment comprising a tubular metal body provided with a threaded portion for supporting a threaded contra angle and having a driving gear for driving the contra angle at its outer end, and at its inner end a driven member with a pair of longitudinally extending spaced driven lugs, said driven lugs and driving lugs interengaging and having a loose driving connection for minimizing vibration of said handpiece, which is due to said driving connection.

9. In a dental handpiece, the combination of a supporting wrist joint having an enlarged housing provided with an elongated axially extending tube, a ball bearing carried by said enlarged housing and rotatably supporting one end of a spindle, a roller bearing carried by the other end of said tube and rotatably supporting the other end of said spindle, a sheath rotatably mounted on said tube and covering said spindle and having an axial opening, and quickly attachable and detachable means for joining together two parts of said sheath which are separable, one of said sheath parts being removable for substitution of a similar part having a driven shaft with axially extending driven lugs, the said spindle being provided at its end with axially extending driving lugs having a loose driving connection with said driven lugs for transmitting the rotation of said spindle to said shaft, said driving and driven lugs having a loose connection, reducing to a minimum lateral vibration of the handpiece at said lugs, the said sheath including a shorter part adjacent the wrist joint, and a longer part adjacent the tool end, said parts having complementary axial lugs and slots at the point of their juncture, and said lugs having a peripherally extending groove, and a rotating band open at one side for movement into grooves in both lugs to hold the sheath parts together or for rotation out of the groove in one lug to release one part of the sheath from the other.

10. In a dental handpiece, the combination of a supporting tube provided with anti-friction bearings at each of its ends, a spindle rotatably mounted in said anti-friction bearings and having a driving end projecting from said tube, said driving end being provided with a pair of axially extending lugs extending from the periphery of said spindle and having radial driving surfaces, a sheath detachably mounted on said tube, and a contra angle having a housing mounted on said sheath, said contra angle having a driven shaft for supporting the shanks of tools and having a driving shaft geared to said driven shaft, said driving shaft terminating in a driving coupling similar to the end of said spindle and having a pair of axially extending lugs provided with radial driving surfaces loosely engaging the driving lugs on the end of said spindle, said driving and driven lugs having a peripheral clearance between them which is greater than the peripheral thickness of the lugs, the said loosely engaging driving lugs effecting a drive of said contra angle at high speed with a minimum of handpiece vibration.

11. In a dental handpiece, the combination of a supporting tube provided with anti-friction bearings at each of its ends, a spindle rotatably mounted in said anti-friction bearings and having a driving end projecting from said tube, said driving end being provided with a pair of axially extending lugs extending from the periphery of said spindle and having radial driving surfaces, a sheath detachably mounted on said tube, and a dental hammer having a housing secured to the end of said sheath, the said dental hammer having a reciprocating sleeve for supporting hammer tool shanks, and having a driven shaft provided with a dog for hammering a flange on said sleeve, the said driven shaft being geared to a driving shaft, said driving shaft terminating adjacent the end of said spindle, with a pair of axially extending driving lugs having radial driving surfaces loosely engaging the driving lugs on said spindle, said driving lugs having a peripheral thickness which is a small fraction of the adjacent peripheral space beside the lugs, for effecting a high speed drive of said dental hammer with a minimum amount of vibration.

12. In a dental handpiece, the combination of a first sheath tube having a driving spindle rotatably mounted in said tube, anti-friction bearings in said tube rotatably mounting said spindle, the said spindle having at its free end a first pair of axially extending driving lugs with radial side surfaces on said lugs, a second sheath tube secured to the first sheath tube and a driven spindle rotatably mounted in said second sheath tube, said driven spindle having a second pair of axially extending lugs with radial side surfaces on said latter lugs, the said pairs of lugs being receivable in overlapping driving relation, said lugs in each case comprising an axial extension of the spindle carrying them, each pair of lugs being separated radially by a spindle bore, and each lug being wider radially than its peripheral width, leaving a vacant space peripherally between the lugs on each spindle adapted to receive the lugs of the other spindle with a clearance between driving and driven lugs peripherally which is wider than any of the lugs, for effecting a high speed drive with a minimum amount of vibration.

13. In a dental handpiece, the combination of a first sheath having a peripherally grooved extension with an axial groove in said extension, said axial groove transversing said peripheral groove, and a second sheath having an axial extension fitting in said axial groove, said axial extension having a peripheral groove registering with the first-mentioned peripheral groove, and a sliding rotatable band in said first-mentioned groove and said band having a gap for passing said axial extension when the band is rotated to have its gap register with said axial groove.

14. In a dental handpiece, a supporting sheath having a threaded end and having a driving spindle rotatably mounted therein, and provided at its end with axial driving lugs, an extension secured to said sheath having a complementary threaded end, and having a driven shaft mounted in a bearing and provided at its driven end with axial driven lugs, said lugs having a peripheral clearance from each other at the overlapping portion of the driving and driven lugs, which clearance is greater than the peripheral thickness of the lugs, providing a loose driving connection, reducing vibration when driven at speeds in excess of 12,000 r.p.m.

15. A dental handpiece according to claim 14, in which the said extension has a threaded connection to a contra angle housing containing a driven shaft connecting gears and a tool supporting shaft for a rotatable bur.

16. A dental handpiece according to claim 14, in which the said extension is provided with a threaded connection to a contra angle housing having a driven shaft connecting gears and a reciprocable dental plugger shaft for holding a dental plugger.

17. A dental handpiece adapted to drive dental burs and also drive attachments having axially projecting, widely spread lugs on the end of the driven shaft, comprising a handpiece having a sheath and a spindle rotatably mounted in said sheath, said spindle including a tubular part having a reduced portion mounted in roller bearings, said tubular part having a bore ending in an inner cone at its tool end, a split collet with a cone end to be contracted by said inner cone to grip a bur shank, said tubular part having a smaller bore in its end leading to the collet interior, and having a pair of widely spaced narrow axial lugs on the end of the tubular part, and a tapered housing for the tubular part, having an end bore and an inner counterbore.

18. In an apparatus of the class described, a hollow body having an apertured end wall, a spindle extending through said end wall, an antifriction bearing located within the body and including inner and outer race means, the outer race means abutting said end wall, a fixed annular shoulder on the spindle engaging a front face of the inner race means, externally accessible means on the spindle for engaging a rear face of the inner race means and thereby cooperative with said annular shoulder for clamping the antifriction devices upon the spindle, an inner sheath structure connected to said hollow head and extending forwardly therefrom along a part of the length of the spindle, a bearing at the front end of the inner sheath for supporting the spindle, an outer structure surrounding the inner sheath structure and extending therebeyond for providing a stationary nose for the handpiece, and removable means for pressing the outer structure against said hollow head.

19. An apparatus as in claim 18, in which the inner sheath structure has an enlarged bore at its front end, and the bearing at the front end of said inner sheath is of antifriction type and includes outer race means tightly fitting said enlarged bore and abutting a shoulder at the inner end of said enlarged bore.

20. An apparatus as in claim 19, including a retainer secured within the inner sheath structure in engagement with the outer race means of the front antifriction bearing for maintaining the said bearing against said shoulder.

21. A dental handpiece comprising a rear bearing housing having an enlarged bore, and an inner annular shoulder surrounding a smaller bore, an antifriction bearing comprising an outer race, an inner race, and rolling elements, said outer race being mounted in said enlarged bore against said annular shoulder, threaded means carried by said housing and engaging the other end of said outer race to secure the outer race in said bearing housing, a spindle having an annular shoulder engaging the forward end of said inner race, a drive pulley fixedly mounted on said spindle, and a spacer tube between said pulley and the other end of said inner race, an elongated tubular member carried by said bearing housing and extending forwardly about said spindle but spaced from said spindle, a second antifriction bearing supporting the forward end of said spindle in said tubular member and comprising a second inner race, a second outer race and rolling elements, said second outer race being mounted in a through bore in said tubular member, and said second inner race being mounted on the forward end of said spindle.

22. A dental handpiece according to claim 21, in which the said housing rotatably supports an outer sheath extending forwardly about said tubular member and a fixed elbow on said housing, the rotatable sheath permitting the elbow to hang downwardly when the sheath is held in the hand.

23. A dental handpiece according to claim 21, in which the inner races are tightly mounted on the sheath, and the outer races are removably mounted in the housing and tubular members so that the spindle unit may be removed as such for cleaning.

24. A dental handpiece arm assembly comprising a hinge plate having a through bore, a tubular pulley shaft in said bore, a set screw threaded in a bore in said plate engaging said shaft, and having a bore in the set screw communicating with the inside of said tubular shaft, a pulley rotatably mounted on rollers on said shaft, a pair of roller retainers threaded into said pulley, a washer for retaining lubricant at each end of the rollers, a cap screw threaded into the end of the tubular shaft, and having a guard rim extending into proximity with the pulley, said shaft having a conduit extending from the inside of the tubular shaft to the rollers for distributing lubricant from said set screw bore to the rollers.

25. An assembly according to claim 24, in which the guard has ventilating openings between the cap screw and the guard rim for cooling the assembly.

26. A long sleeve handpiece assembly comprising a dental handpiece having a sheath with a removable front section and a spindle with axial driving lugs, a long replaceable tubular sleeve adapted to receive said spindle, said sleeve having a solid end section containing an axial through bore forming a bearing, a shaft in said bearing, having a gear on its outer end and having a driven fitting on its inner end provided with driven axial lugs, meshing with the driving lugs of said spindle, and a coil spring having one end anchored in the driven fitting and surrounding the driving and driven lugs to maintain their alignment.

27. A short sleeve handpiece assembly comprising a dental handpiece having a front sheath section with a nose piece and a spindle with a chuck, a tubular member having a solid end portion with a bearing bore and a shaft in said bore, a gear on the outer end of said shaft, said shaft being receivable in and secured in said chuck, said tubular member fitting on said nose piece, and having means for preventing its rotation relative to said nose piece.

28. In an apparatus of the class described, a hollow body having a threaded cap thereon with an aperture in said cap, a spindle extending through said cap and clearing said aperture, an anti-friction bearing located within the body and including inner and outer race means, the outer race means abutting the inside of said cap, a fixed annular shoulder on the spindle engaging a front face of the inner race means, externally accessible means on the spindle for engaging a rear face of the inner race means and thereby cooperative with said collar for clamping the antifriction devices upon the spindle, an inner sheath structure connected to said hollow head and extending forwardly therefrom along a part of the length of the spindle, a bearing at the front end of the inner sheath for supporting the spindle, an outer structure surrounding the inner sheath structure and extending therebeyond for providing a stationary nose for the handpiece, and removable means for pressing the outer structure against said hollow head.

References Cited in the file of this patent

UNITED STATES PATENTS

| | | |
|---|---|---|
| 2,468,171 | Carlson | Apr. 26, 1949 |
| 2,660,441 | Toelcke | Nov. 24, 1953 |
| 2,666,259 | Thau-Jensen | Jan. 19, 1954 |
| 2,701,914 | Dietrich | Feb. 15, 1955 |
| 2,740,674 | Zay et al. | Apr. 3, 1956 |